United States Patent
Garcia

(10) Patent No.: US 10,573,151 B1
(45) Date of Patent: Feb. 25, 2020

(54) AUTOMOBILE CHILD SAFETY ALERT SYSTEM

(71) Applicant: Yvette Garcia, Charlotte, NC (US)

(72) Inventor: Yvette Garcia, Charlotte, NC (US)

( * ) Notice: Subject to any disclaimer, the term of this patent is extended or adjusted under 35 U.S.C. 154(b) by 0 days.

(21) Appl. No.: 16/260,273

(22) Filed: Jan. 29, 2019

(51) Int. Cl.
| | |
|---|---|
| G08B 1/08 | (2006.01) |
| G08B 21/02 | (2006.01) |
| G08B 21/22 | (2006.01) |
| G08B 21/24 | (2006.01) |
| G08B 5/22 | (2006.01) |
| B60Q 9/00 | (2006.01) |
| G08B 3/10 | (2006.01) |
| H04B 1/3816 | (2015.01) |

(52) U.S. Cl.
CPC ......... *G08B 21/0202* (2013.01); *G08B 21/22* (2013.01); *G08B 21/24* (2013.01); *B60Q 9/00* (2013.01); *G08B 3/1016* (2013.01); *G08B 5/223* (2013.01); *H04B 1/3816* (2013.01)

(58) Field of Classification Search
None
See application file for complete search history.

(56) References Cited

U.S. PATENT DOCUMENTS

| 8,841,997 | B2 | 9/2014 | Silveira |
| D784,312 | S | 4/2017 | Yoon |
| 9,741,224 | B1 | 8/2017 | Singh |
| 9,789,786 | B2 | 10/2017 | Westmoreland |
| 10,115,029 | B1* | 10/2018 | Day ................... G06K 9/00832 |
| 2011/0102169 | A1* | 5/2011 | Orbach ................... B60N 2/002 |
| | | | 340/457 |
| 2015/0279195 | A1 | 10/2015 | Qian |
| 2017/0116839 | A1 | 4/2017 | Friedman |
| 2018/0355639 | A1* | 12/2018 | Ring ....................... B60Q 9/00 |

FOREIGN PATENT DOCUMENTS

WO 2008030417 6/2008

* cited by examiner

*Primary Examiner* — Adolf Dsouza
(74) *Attorney, Agent, or Firm* — Kyle A. Fletcher, Esq.

(57) ABSTRACT

The automobile child safety alert system is an alarm system that comprises an automobile, a vehicle circuit, a fob circuit, and a dongle. The vehicle circuit mounts in the automobile. The fob circuit and the dongle are handheld devices. The dongle plugs into the vehicle circuit. The automobile further comprises a VECU. The automobile child safety alert system monitors the VECU to determine the operational status of the automobile. When the engine of the automobile is turned off, the vehicle circuit transmits a first message to the fob circuit. If fob circuit fails to acknowledge the first message after a previously determined amount of time, the vehicle circuit signals the VECU to: a) open the windows of the automobile; and, b) initiate the sounding of the horn and the flashing of the lights of the automobile. The dongle physically disables the operation of the vehicle circuit.

19 Claims, 5 Drawing Sheets

AUTOMOBILE CHILD SAFETY ALERT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and signaling systems including alarms responding to a single undesired event, more specifically, a vehicle status alarm. (G08B21/00)

SUMMARY OF INVENTION

The automobile child safety alert system is an alarm system. The automobile child safety alert system comprises an automobile, a vehicle circuit, a fob circuit, and a dongle. The vehicle circuit mounts in the automobile. The fob circuit and the dongle are handheld devices. The dongle plugs into the vehicle circuit. The automobile further comprises a VECU and an external power system.

The automobile child safety alert system monitors the VECU to determine the operational status of the automobile. When the engine of the automobile is turned off, the vehicle circuit transmits a first message to the fob circuit. If fob circuit fails to acknowledge the first message after a previously determined amount of time, the vehicle circuit signals the VECU to: a) open the windows of the automobile; and, b) initiate the sounding of the horn and the flashing of the lights of the automobile. The dongle physically disables the operation of the vehicle circuit.

These together with additional objects, features and advantages of the automobile child safety alert system will be readily apparent to those of ordinary skill in the art upon reading the following detailed description of the presently preferred, but nonetheless illustrative, embodiments when taken in conjunction with the accompanying drawings.

In this respect, before explaining the current embodiments of the automobile child safety alert system in detail, it is to be understood that the automobile child safety alert system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automobile child safety alert system.

It is therefore important that the claims be regarded as including such equivalent construction insofar as they do not depart from the spirit and scope of the automobile child safety alert system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
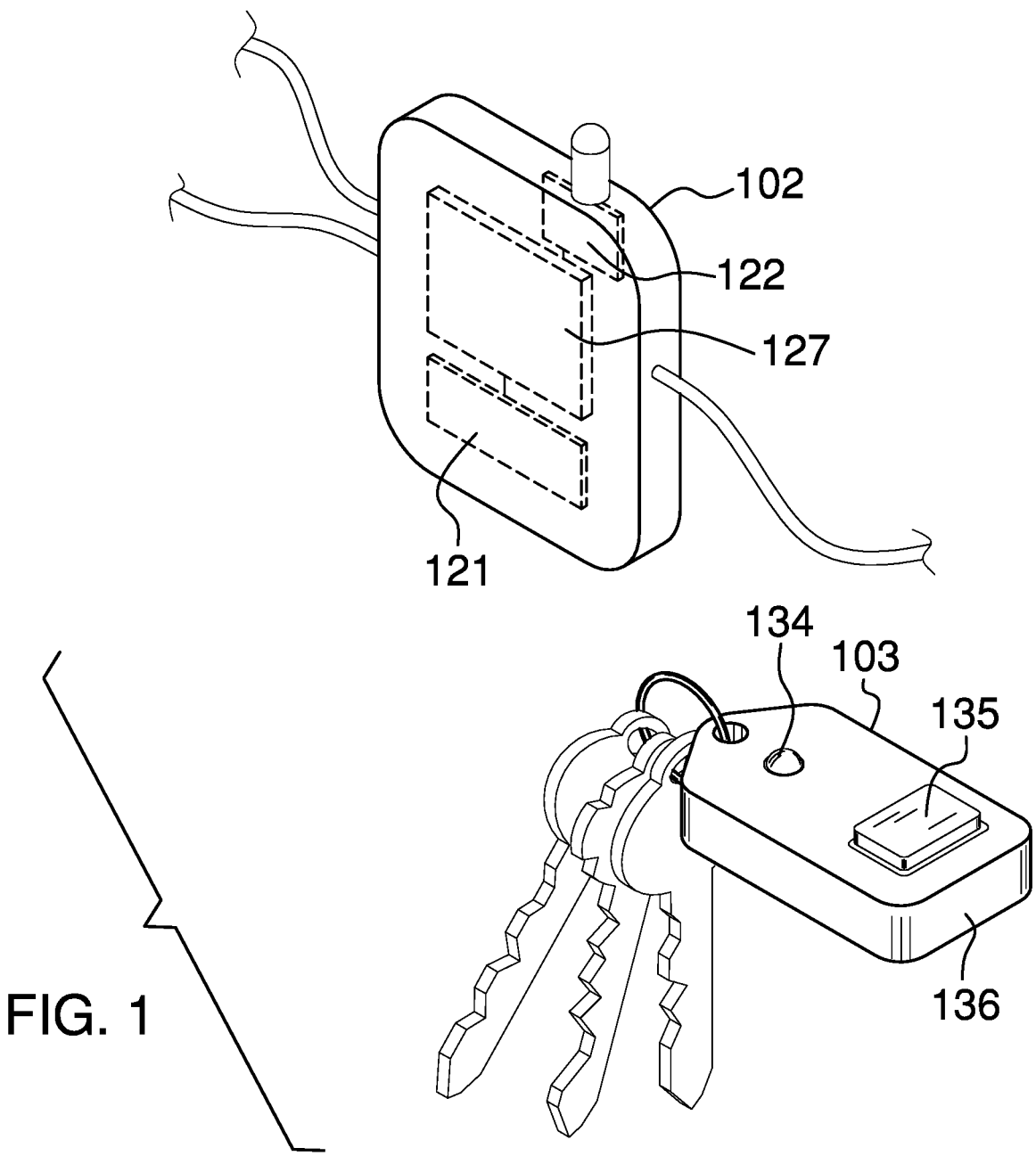
FIG. 1 is a perspective view of an embodiment of the disclosure.
Figure 2:
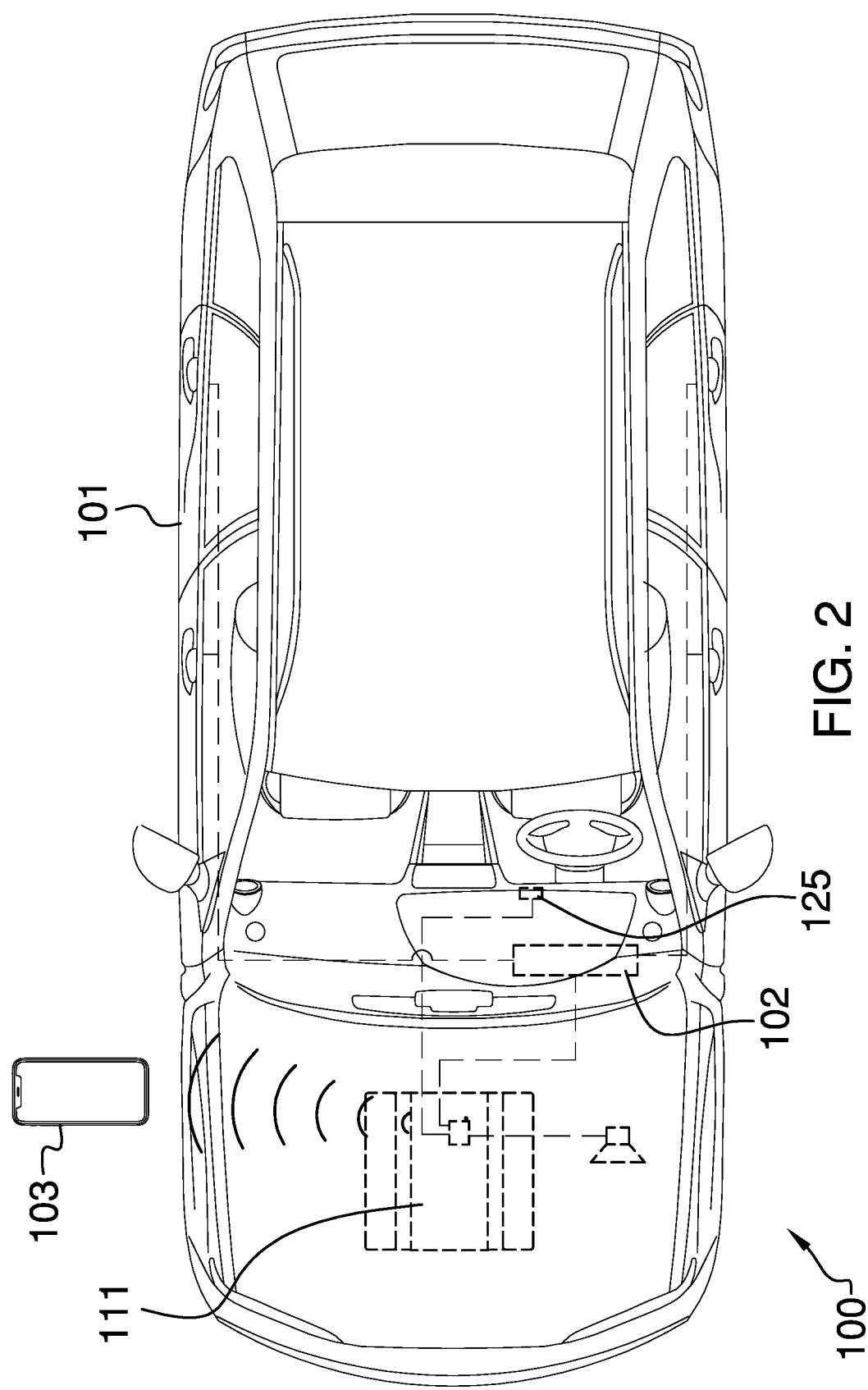
FIG. 2 is a top view of an embodiment of the disclosure.
Figure 3:
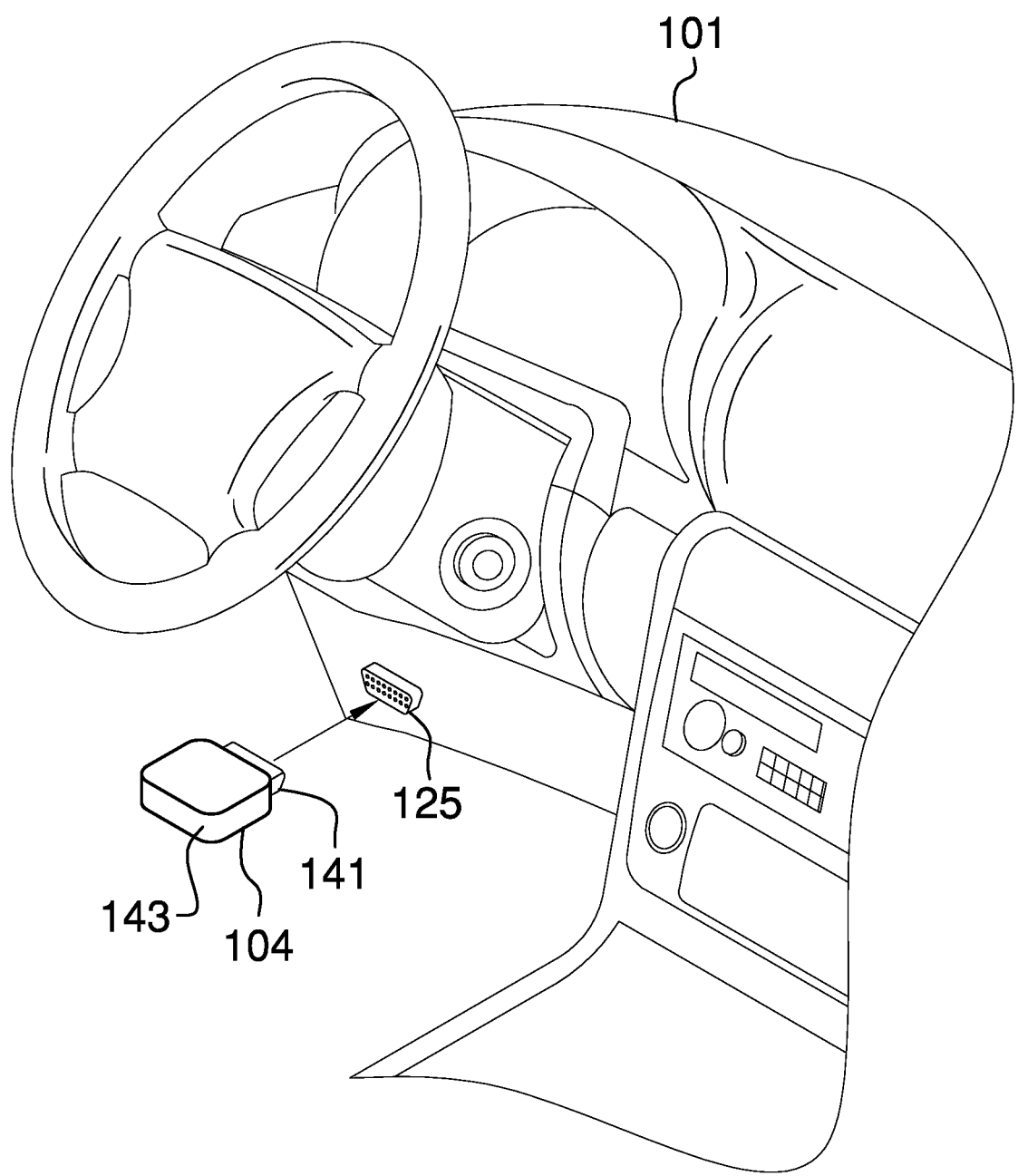
FIG. 3 is an in-use view of an embodiment of the disclosure.
Figure 4:
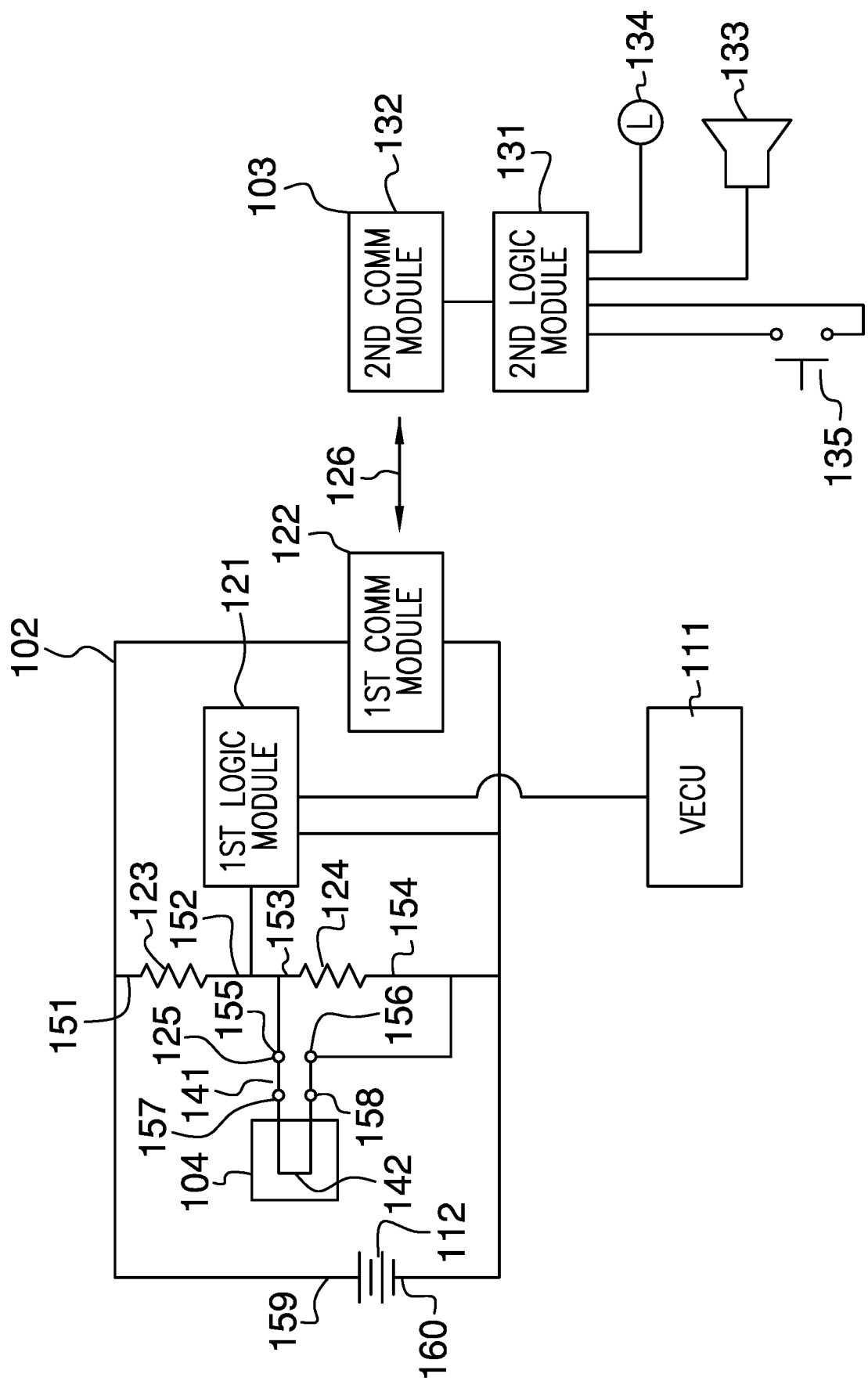
FIG. 4 is a block diagram of an embodiment of the disclosure.
Figure 5:
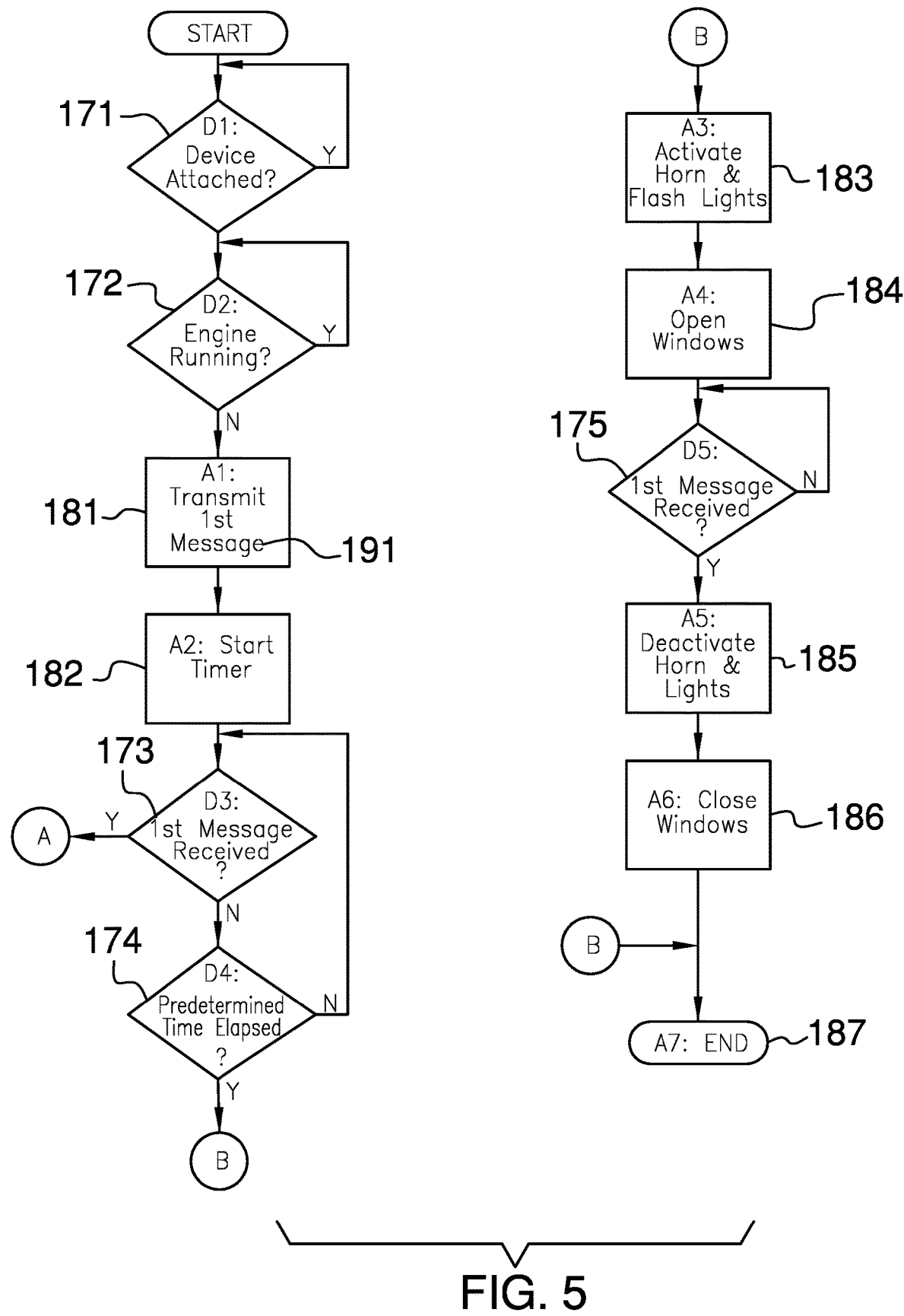
FIG. 5 is a flowchart of an embodiment of the disclosure.

Detailed reference will now be made to one or more potential embodiments of the disclosure, which are illustrated in FIGS. 1 through 5.

The automobile child safety alert system 100 (hereinafter invention) is an alarm system. The invention 100 comprises an automobile 101, a vehicle circuit 102, a fob circuit 103, and a dongle 104. The vehicle circuit 102 mounts in the automobile 101. The fob circuit 103 and the dongle 104 are handheld devices. The dongle 104 plugs into the vehicle circuit 102. The automobile 101 further comprises a VECU 111 and an external power system 112.

The invention 100 monitors the VECU 111 to determine the operational status of the automobile 101. When the engine of the automobile 101 is turned off, vehicle circuit 102 transmits a first message 191 to the fob circuit 103. If fob circuit 103 fails to acknowledge the first message 191 after a previously determined amount of time, the vehicle circuit 102 signals the VECU 111 to: a) open the windows of the automobile 101; and, b) initiate the sounding of the horn and the flashing of the lights of the automobile 101. The dongle 104 physically disables the operation of the vehicle circuit 102.

The automobile 101 is defined in greater detail elsewhere in this disclosure. The automobile 101 further comprises a VECU 111 and an external power system 112. The external power system 112 is further defined with a positive terminal 159 and a negative terminal 160. The VECU 111 is defined in greater detail elsewhere in this disclosure. The external power system 112 is a source of electrical energy. This disclosure assumes that the external power system 112 is the electrical system of the vehicle circuit 102.

The vehicle circuit 102 is an electrical circuit. The vehicle circuit 102 forms a hardwired electrical connection with the VECU 111 of the automobile 101. The vehicle circuit 102 forms a wireless communication link 126 with the fob circuit 103. The vehicle circuit 102 forms an optional hardwired connection with the dongle 104.

The vehicle circuit 102 monitors the VECU 111 to determine if the engine of the automobile 101 is running. The vehicle circuit 102 determines if the dongle 104 is electrically connected to the vehicle circuit 102. The vehicle circuit 102 transmits a first message 191 to the fob circuit 103. The vehicle circuit 102 monitors the fob circuit 103 for an acknowledgment of the first message 191. The vehicle circuit 102 signals the VECU 111 to open and close the windows of the automobile 101. The vehicle circuit 102 signals the VECU 111 to activate and deactivate the horn of the automobile 101. The vehicle circuit 102 signals the VECU 111 to flash the lights of the automobile 101. The vehicle circuit 102 signals the VECU 111 to discontinue flashing the lights of the automobile 101.

The vehicle circuit 102 comprises a first logic module 121, a first communication module 122, a pull-up resistor 123, a load resistor 124, a dongle 104 port 125, and a VC housing 127. The pull-up resistor 123 is further defined with a first lead 151 and a second lead 152. The load resistor 124 is further defined with a third lead 153 and a fourth lead 154. The dongle 104 port 125 is further defined with a fifth lead 155 and a sixth lead 156.

The first logic module 121 is a readily and commercially available programmable electronic device that is used to manage, regulate, and operate the vehicle circuit 102. Depending on the specific design and the selected components, the first logic module 121 can be a separate component within the vehicle circuit 102 or the functions of the first logic module 121 can be incorporated into another component within the vehicle circuit 102.

The first communication module 122 is a wireless electronic communication device that allows the first logic module 121 to wirelessly communicate with the fob circuit 103. Specifically, the first communication module 122 establishes a wireless communication link 126 between the vehicle circuit 102 and the second communication module 132 of the fob circuit 103. In the first potential embodiment of the disclosure, the first communication module 122 supports a communication protocol selected from the group consisting of a WiFi™ protocol or a Bluetooth™ protocol.

The pull-up resistor 123 is an electrical circuit element. The pull-up resistor 123 is wired in series with the load resistor 124. The pull-up resistor 123 limits the flow of electricity through the load resistor 124. The pull-up resistor 123 limits the flow of electricity through the dongle 104. The load resistor 124 is an electrical circuit element. The load resistor 124 is wired in series with the pull-up resistor 123. The load resistor 124 presents a voltage to the first logic module 121 indicating that the dongle 104 is not plugged into the vehicle circuit 102. When the dongle 104 plugs into the vehicle circuit 102, the dongle 104 forms a short circuit around the load resistor 124 indicating the presence of the dongle 104 to the first logic module 121.

The dongle 104 port 125 is an electrical port that forms the physical electrical connection between the dongle 104 and the vehicle circuit 102.

The VC housing 127 is a rigid casing. The VC housing 127 contains the vehicle circuit 102. The VC housing 127 is formed with all apertures and form factors necessary to allow the VC housing 127 to accommodate the use, the operation, and the external connections of the vehicle circuit 102. Methods to form a VC housing 127 suitable for the purposes described in this disclosure are well-known and documented in the mechanical arts.

The fob circuit 103 is an electrical circuit. The fob circuit 103 receives the first message 191 from the vehicle circuit 102. The fob circuit 103 generates an audible alarm indicating that the first message 191 has been received from the vehicle circuit 102. The fob circuit 103 generates a visible alarm indicating that the first message 191 has been received from the vehicle circuit 102. The fob circuit 103 transmits an acknowledgment to the vehicle circuit 102 indicating that the first message 191 has been received and that a required physical action has been taken. The fob circuit 103 comprises a second logic module 131, a second communication module 132, a speaker 133, a lamp 134, a momentary switch 135, and a fob circuit 103 housing 136.

The second logic module 131 controls the operation of the speaker 133 and the lamp 134. The second logic module 131 illuminates the lamp 134 in response to receiving the first message 191 from the vehicle circuit 102. The second logic module 131 transmits an electrical signal to the speaker 133 in response to receiving the first message 191 from the vehicle circuit 102. The second logic module 131 monitors the momentary switch 135. The second logic module 131 transmits an acknowledgment of the first message 191 to the vehicle circuit 102 when the second logic module 131 detects that the momentary switch 135 has been actuated.

The second logic module 131 is a readily and commercially available programmable electronic device that is used to manage, regulate, and operate the fob circuit 103. Depending on the specific design and the selected components, the second logic module 131 can be a separate component within the fob circuit 103 or the functions of the second logic module 131 can be incorporated into another component within the fob circuit 103.

The second communication module 132 is a wireless electronic communication device that allows the second logic module 131 to wirelessly communicate with the vehicle circuit 102. Specifically, the second communication module 132 establishes the wireless communication link 126 between the fob circuit 103 and the first communication module 122 of the vehicle circuit 102. In the first potential embodiment of the disclosure, the second communication module 132 supports a communication protocol selected from the group consisting of a WiFi™ protocol or a Bluetooth™ protocol. The first communication module 122 and the second communication module 132 combine to form a wireless communication link 126.

The speaker 133 is a transducer that converts the electrical signals received from the second logic module 131 into audible sounds. The second logic module 131 controls the operation of the speaker 133. The speaker 133 audibly indicates that the first message 191 has been received. The lamp 134 is a two-terminal electrical device. The second logic module 131 controls the operation of the lamp 134. The lamp 134 visibly indicates that the first message 191 has been received. In the first potential embodiment of the disclosure, the lamp 134 is an LED.

The momentary switch 135 is a momentary electrical switch. The momentary switch 135 electrically connects to the second logic module 131. The second logic module 131 monitors the momentary switch 135. The actuation of the momentary switch 135 is the required physical action that indicates to the second logic module 131 that the first message 191 should be acknowledged.

The fob circuit 103 housing 136 is a rigid casing. The fob circuit 103 housing 136 contains the fob circuit 103. The fob circuit 103 housing 136 is formed with all apertures and form factors necessary to allow the fob circuit 103 housing 136 to accommodate the use, the operation, and the external connections of the fob circuit 103. Methods to form a fob circuit 103 housing 136 suitable for the purposes described in this disclosure are well-known and documented in the mechanical arts.

The dongle 104 is an electrical circuit. The dongle 104 forms a detachable electrical connection with the vehicle circuit 102. The electrical connection of the dongle 104 to the vehicle circuit 102 disables the operation of the vehicle circuit 102. Electrically detaching the dongle 104 from the vehicle circuit 102 enables the operation of the vehicle circuit 102.

The dongle 104 comprises a dongle 104 plug 141, a circuit closure 142, and a dongle 104 housing 143. The dongle 104 plug 141 is further defined with a seventh lead 157 and an eighth lead 158.

The dongle 104 plug 141 is an electrical plug. The dongle 104 plug 141 is compatible with the dongle 104 port 125 such that the dongle 104 plug 141 plugs into the dongle 104 port 125. The circuit closure 142 is an electrical connection between the seventh lead 157 and the eighth lead 158 of the dongle 104 plug 141. The circuit closure 142 forms an electrical short between the seventh lead 157 and the eighth lead 158 that creates an electrical short circuit that bypasses the load resistor 124 when the dongle 104 plug 141 inserts into the dongle 104 port 125.

The dongle 104 housing 143 is a rigid casing. The dongle 104 housing 143 contains the dongle 104 plug 141 and the circuit closure 142. The dongle 104 housing 143 is formed with all apertures and form factors necessary to allow the dongle 104 housing 143 to accommodate the use, the operation, and the external connections of the dongle 104 plug 141 and the circuit closure 142. Methods to form a dongle 104 housing 143 suitable for the purposes described in this disclosure are well-known and documented in the mechanical arts.

The following eight paragraphs describe the operation of the first logic module 121.

The first logic module 121 makes a first decision 171 to determine if the dongle 104 is plugged into the vehicle circuit 102 by checking the voltage across the load resistor 124. If the first logic module 121 determines that the dongle 104 is installed, the first logic module 121 loops back to the first decision 171.

If the first logic module 121 determines that the dongle 104 is not installed the first logic module 121 makes a second decision 172 by querying the VECU 111 to determine if the engine is running. If the first logic module 121 determines that the engine is running, the first logic module 121 loops back to the second decision 172. If the first logic module 121 determines that the engine is not running, the first logic module 121 takes a first action 181.

The first action 181 comprises transmitting a first message 191 reminding the receiver to visually check the automobile 101 for anomalies such as a passenger left behind. The first logic module 121 transmits the first message 191 through the first communication module 122 and over the wireless communication link 126 to the second communication module 132 of the fob circuit 103. The first logic module 121 next takes a second action 182 of starting a timing device. This disclosure assumes that the timing device is provisioned with the first logic module 121.

The first logic module 121 makes a third decision 173 by querying the first communication module 122 to determine if the first message 191 has been acknowledged by the fob circuit 103. If the first logic module 121 determines that the first message 191 has been acknowledged, the first logic module 121 takes a seventh action 187 of terminating the operation of the vehicle circuit 102. If the first logic module 121 determines that the first message 191 has not been acknowledged, the first logic module 121 takes a fourth decision 174.

The fourth decision 174 comprises querying the timing device to determine whether a previously determined amount of time has elapsed. If the previously determined amount of time has not elapsed, the first logic module 121 loops back to the third decision 173. If the previously determined amount of time has elapsed, the first logic module 121 takes both a third action 183 and a fourth action 184.

The third action 183 comprises the first logic module 121 signaling the VECU 111 to automatically open the windows of the automobile 101. The fourth action 184 comprises the first logic module 121 signaling the VECU 111 to automatically activate the horn of the automobile 101 and flash the lights of the automobile 101. It shall be noted that the third action 183 may be interchanged with the fourth action 184 such that the horn of the automobile 101 and flashing of the lights of the automobile 101 occurs before automatically open the windows of the automobile 101.

The first logic module 121 next makes a fifth decision 175 by querying the first communication module 122 to determine if the first message 191 has been acknowledged by the fob circuit 103. If the first logic module 121 determines that the first message 191 has not been acknowledged, the first logic module 121 loops back to the fifth decision 175.

If the first logic module 121 determines that the first message 191 has been acknowledged, the first logic module 121 takes a fifth action 185 of signaling the VECU 111 to deactivate both the horn of the automobile 101 and the discontinue the flashing of the lights of the automobile 101. The first logic module 121 next takes a sixth action 186 of signaling the VECU 111 to automatically close the windows of the automobile 101. After the sixth action 186, the first logic module 121 takes the seventh action 187 of terminating the operation of the vehicle circuit 102.

The following three paragraphs describe the assembly and operation of the vehicle circuit 102.

The positive terminal 159 of the external power system 112 electrically connects to the first lead 151 of the pull-up resistor 123. The second lead 152 of the pull-up resistor 123 electrically connects to the third lead 153 of the load resistor 124. The seventh lead 157 of the dongle 104 plug 141 electrically connects to the fifth lead 155 of the dongle 104 port 125. The eighth lead 158 of the dongle 104 plug 141 electrically connects to the sixth lead 156 of the dongle 104 port 125. The fifth lead 155 of the dongle 104 port 125 electrically connects to the third lead 153 of the load resistor 124. The sixth lead 156 of the dongle 104 port 125 electrically connects to the fourth lead 154 of the load resistor 124. The negative terminal 160 of the external power system 112 electrically connects to the fourth lead 154 of the load resistor 124.

The positive terminal 159 of the external power system 112 electrically connects to the power input of the first logic module 121. The positive terminal 159 of the external power system 112 electrically connects to the power input of the first communication module 122. The negative terminal 160 of the external power system 112 electrically connects to the ground input of the first logic module 121. The negative terminal 160 of the external power system 112 electrically connects to the ground input of the first communication module 122.

The first logic module 121 monitors the voltage at the third lead 153 of the load resistor 124. When the dongle 104 plug 141 of the dongle 104 inserts into the dongle 104 port 125 of the vehicle circuit 102, the circuit closure 142 of the dongle 104 shorts out the load resistor 124 which is measured as zero voltage by the first logic module 121 indicating the presence of the dongle 104 and that the operation of the vehicle circuit 102 should be disabled.

The following definitions were used in this disclosure:

Automatic: As used in this disclosure, automatic refers to a device, process, or a system that operates without human control, supervision or participation in the operation of the device, process, or system.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is further defined with a hood panel and a roof panel. The automobile is often defined with a trunk panel.

Bluetooth™: As used in this disclosure, Bluetooth™ is a standardized communication protocol that is used to wirelessly interconnect electronic devices.

Cable: As used in this disclosure, a cable is a collection of insulated wires covered by a protective casing that is used for transmitting electricity or telecommunication signals.

Dongle: As used in this disclosure, a dongle is a second electrical circuit that plugs into a first electrical circuit. The first electrical circuit and the second electrical circuit are typically housed independently. The operation of the first electrical circuit is influenced by the connection of the second electrical circuit.

External Power Source: As used in this disclosure, an external power source is a source of the energy that is externally provided to enable the operation of the present disclosure. Examples of external power sources include, but are not limited to, electrical power sources and compressed air sources.

Fob: As used in this disclosure, a fob is a container that: a) contains an electric circuit; and, b) is carried by a person as a domestic article.

Form Factor: As used in this disclosure, the term form factor refers to the size and shape of an object.

Handheld: As used in this disclosure, when referring to an item or device, handheld means that the item or device is small and light enough: 1) to be operated while a person holds the item or device in their hands; and, 2) to be carried by hand over a distance.

Hardwired: As used in this disclosure, the term hardwired refers to a physical electrical connection, generally using cable, between two electrical circuits or circuit elements. Such a hardwired connection is considered more reliable than a wireless connection.

Housing: As used in this disclosure, a housing is a rigid casing that encloses and protects one or more devices.

Lamp: As used in this disclosure, a lamp is an electrical device that generates (typically visible) electromagnetic radiation.

LED: As used in this disclosure, an LED is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

Load Resistor: As used in this disclosure, a load resistor is an electrical resistor that is used to present a voltage to an electrical device. The presented voltage is controlled by controlling the amount of electrical current passing through the load resistor.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Pull-Up Resistor: As used in this disclosure, a pull-up resistor is an electrical resistor that is used to: 1) limit the current flow through a switching device; and, 2) to control the voltage level presented across a switch, a load resistor, or a pull-down resistor.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Transducer: As used in this disclosure, a transducer is a device that converts a physical quantity, such as pressure or brightness into an electrical signal or a device that converts an electrical signal into a physical quantity.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device that is used for transporting passengers, goods, or equipment. The term motorized vehicle refers to a vehicle can move under power provided by an electric motor or an internal combustion engine.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An automobile child safety alert system comprising:
an automobile, a vehicle circuit, a fob circuit, and a dongle;
wherein the vehicle circuit mounts in the automobile;
wherein the fob circuit and the dongle are handheld devices;
wherein the dongle plugs into the vehicle circuit;
wherein the automobile child safety alert system is an alarm system;
wherein the automobile further comprises a Vehicle Engine Control Unit (hereinafter VECU) and an external power system;
wherein the external power system is further defined with a positive terminal and a negative terminal;
wherein the automobile child safety alert system monitors the VECU to determine the operational status of the automobile;
wherein the dongle is an electrical circuit;
wherein the dongle forms a detachable electrical connection with the vehicle circuit;
wherein the electrical connection of the dongle to the vehicle circuit disables the operation of the vehicle circuit;
wherein electrically detaching the dongle from the vehicle circuit enables the operation of the vehicle circuit.

2. The automobile child safety alert system according to claim 1 wherein the vehicle circuit transmits a first message to the fob circuit.

3. The automobile child safety alert system according to claim 2 wherein the dongle controls the operation of the vehicle circuit.

4. The automobile child safety alert system according to claim 3 wherein the vehicle circuit is an electrical circuit;
wherein the vehicle circuit forms a hardwired electrical connection with the VECU of the automobile;
wherein the vehicle circuit forms a wireless communication link with the fob circuit;
wherein the vehicle circuit forms an optional hardwired connection with the dongle.

5. The automobile child safety alert system according to claim 4 wherein the fob circuit is an electrical circuit;
wherein the fob circuit receives the first message from the vehicle circuit;
wherein the fob circuit generates an audible alarm indicating that the first message has been received from the vehicle circuit;
wherein the fob circuit generates a visible alarm indicating that the first message has been received from the vehicle circuit;
wherein the fob circuit transmits an acknowledgment to the vehicle circuit indicating that the first message has been received and that a required physical action has been taken.

6. The automobile child safety alert system according to claim 5 wherein the vehicle circuit monitors the VECU to determine if the engine of the automobile is running;
wherein the vehicle circuit determines if the dongle is electrically connected to the vehicle circuit;
wherein the vehicle circuit monitors the fob circuit for an acknowledgment of the first message;
wherein the vehicle circuit signals the VECU to open and close the windows of the automobile;
wherein the vehicle circuit signals the VECU to activate and deactivate the horn of the automobile;
wherein the vehicle circuit signals the VECU to flash the lights of the automobile;
wherein the vehicle circuit signals the VECU to discontinue flashing the lights of the automobile.

7. The automobile child safety alert system according to claim 6 wherein the vehicle circuit comprises a first logic module, a first communication module, a pull-up resistor, a load resistor, a dongle port, and a VC housing;
wherein the VC housing contains the first logic module, the first communication module, the pull-up resistor, the load resistor, the dongle port, and the VC housing;
wherein the first logic module, the first communication module, the pull-up resistor, the load resistor, the dongle port, and the VC housing are electrically interconnected;

wherein the pull-up resistor is further defined with a first lead and a second lead;

wherein the load resistor is further defined with a third lead and a fourth lead;

wherein the dongle port is further defined with a fifth lead and a sixth lead.

8. The automobile child safety alert system according to claim 7 wherein the fob circuit comprises a second logic module, a second communication module, a speaker, a lamp, a momentary switch, and a fob circuit housing;

wherein the fob circuit housing contains the second logic module, the second communication module, the speaker, the lamp, and the momentary switch;

wherein the second logic module, the second communication module, the speaker, the lamp, and the momentary switch are electrically interconnected;

wherein the second logic module controls the operation of the speaker and the lamp;

wherein the second logic module illuminates the lamp in response to receiving the first message from the vehicle circuit;

wherein the second logic module transmits an electrical signal to the speaker in response to receiving the first message from the vehicle circuit;

wherein the second logic module monitors the momentary switch;

wherein the second logic module transmits an acknowledgment of the first message to the vehicle circuit when the second logic module detects that the momentary switch has been actuated.

9. The automobile child safety alert system according to claim 8 wherein the dongle comprises a dongle plug, a circuit closure, and a dongle housing;

wherein the dongle housing contains the dongle plug and the circuit closure;

wherein the dongle forms a short circuit around the load resistor indicating the presence of the dongle to the first logic module;

wherein the dongle plug is further defined with a seventh lead and an eighth lead.

10. The automobile child safety alert system according to claim 9 wherein the first communication module is a wireless electronic communication device that allows the first logic module to wirelessly communicate with the fob circuit;

wherein the first communication module establishes a wireless communication link between the vehicle circuit and the fob circuit.

11. The automobile child safety alert system according to claim 10 wherein the pull-up resistor is wired in series with the load resistor;

wherein the pull-up resistor limits the flow of electricity through the load resistor;

wherein the pull-up resistor limits the flow of electricity through the dongle;

wherein the load resistor is an electrical circuit element;

wherein the load resistor is wired in series with the pull-up resistor;

wherein the load resistor presents a voltage to the first logic module indicating that the dongle is not plugged into the vehicle circuit;

wherein the dongle port is an electrical port that forms a physical electrical connection between the dongle and the vehicle circuit.

12. The automobile child safety alert system according to claim 11 wherein the second logic module is a programmable electronic device;

wherein the second communication module is a wireless electronic communication device that allows the second logic module to wirelessly communicate with the vehicle circuit;

wherein the second communication module establishes the wireless communication link between the fob circuit and the first communication module of the vehicle circuit.

13. The automobile child safety alert system according to claim 12 wherein the speaker is a transducer that converts the electrical signals received from the second logic module into audible sounds;

wherein the second logic module controls the operation of the speaker;

wherein the speaker audibly indicates that the first message has been received;

wherein the lamp is a two-terminal electrical device;

wherein the second logic module controls the operation of the lamp;

wherein the lamp visibly indicates that the first message has been received.

14. The automobile child safety alert system according to claim 13 wherein the momentary switch is a momentary electrical switch;

wherein the momentary switch electrically connects to the second logic module;

wherein the second logic module monitors the momentary switch;

wherein the actuation of the momentary switch is the required physical action that indicates to the second logic module that the first message should be acknowledged.

15. The automobile child safety alert system according to claim 14 wherein the dongle plug is an electrical plug;

wherein the dongle plug is compatible with the dongle port such that the dongle plug plugs into the dongle port;

wherein the circuit closure is an electrical connection between the seventh lead and the eighth lead of the dongle plug;

wherein the circuit closure forms an electrical short between the seventh lead and the eighth lead that creates an electrical short circuit that bypasses the load resistor when the dongle plug inserts into the dongle port.

16. The automobile child safety alert system according to claim 15 wherein the first logic module is a programmable electronic device.

17. The automobile child safety alert system according to claim 16 wherein the positive terminal of the external power system electrically connects to the first lead of the pull-up resistor;

wherein the second lead of the pull-up resistor electrically connects to the third lead of the load resistor;

wherein the seventh lead of the dongle plug electrically connects to the fifth lead of the dongle port;

wherein the eighth lead of the dongle plug electrically connects to the sixth lead of the dongle port;

wherein the fifth lead of the dongle port electrically connects to the third lead of the load resistor;

wherein the sixth lead of the dongle port electrically connects to the fourth lead of the load resistor;

wherein the negative terminal of the external power system electrically connects to the fourth lead of the load resistor;

wherein the positive terminal of the external power system electrically connects to the power input of the first logic module;

wherein the positive terminal of the external power system electrically connects to the power input of the first communication module;

wherein the negative terminal of the external power system electrically connects to the ground input of the first logic module;

wherein the negative terminal of the external power system electrically connects to the ground input of the first communication module;

wherein the first logic module monitors the voltage at the third lead of the load resistor.

18. The automobile child safety alert system according to claim 15 wherein the first logic module is a programmable electronic device;

wherein the first logic module makes a first decision to determine if the dongle is plugged into the vehicle circuit;

wherein the first logic module makes a second decision to determine if the engine is running;

wherein the first logic module takes a first action of transmitting the first message to the fob circuit;

wherein the first logic module takes a second action of starting a timing device;

wherein the first logic module makes a third decision to determine if the first message has been acknowledged by the fob circuit;

wherein the first logic module takes a fourth decision whether a previously determined amount of time has elapsed;

wherein the first logic module takes a third action of signaling the VECU automatically activate the horn of the automobile and flash the lights of the automobile;

wherein the first logic module takes a fourth action of signaling the VECU to to automatically open the windows of the automobile;

wherein the first logic module takes a fifth action of signaling the VECU to deactivate both the horn of the automobile and the discontinue the flashing of the lights of the automobile;

wherein the first logic module next takes a sixth action of signaling the VECU to automatically close the windows of the automobile;

wherein the first logic module takes the seventh action of terminating the operation of the vehicle circuit.

19. The automobile child safety alert system according to claim 18 wherein the positive terminal of the external power system electrically connects to the first lead of the pull-up resistor;

wherein the second lead of the pull-up resistor electrically connects to the third lead of the load resistor;

wherein the seventh lead of the dongle plug electrically connects to the fifth lead of the dongle port;

wherein the eighth lead of the dongle plug electrically connects to the sixth lead of the dongle port;

wherein the fifth lead of the dongle port electrically connects to the third lead of the load resistor;

wherein the sixth lead of the dongle port electrically connects to the fourth lead of the load resistor;

wherein the negative terminal of the external power system electrically connects to the fourth lead of the load resistor;

wherein the positive terminal of the external power system electrically connects to the power input of the first logic module;

wherein the positive terminal of the external power system electrically connects to the power input of the first communication module;

wherein the negative terminal of the external power system electrically connects to the ground input of the first logic module;

wherein the negative terminal of the external power system electrically connects to the ground input of the first communication module;

wherein the first logic module monitors the voltage at the third lead of the load resistor.

\* \* \* \* \*